Figure 5:
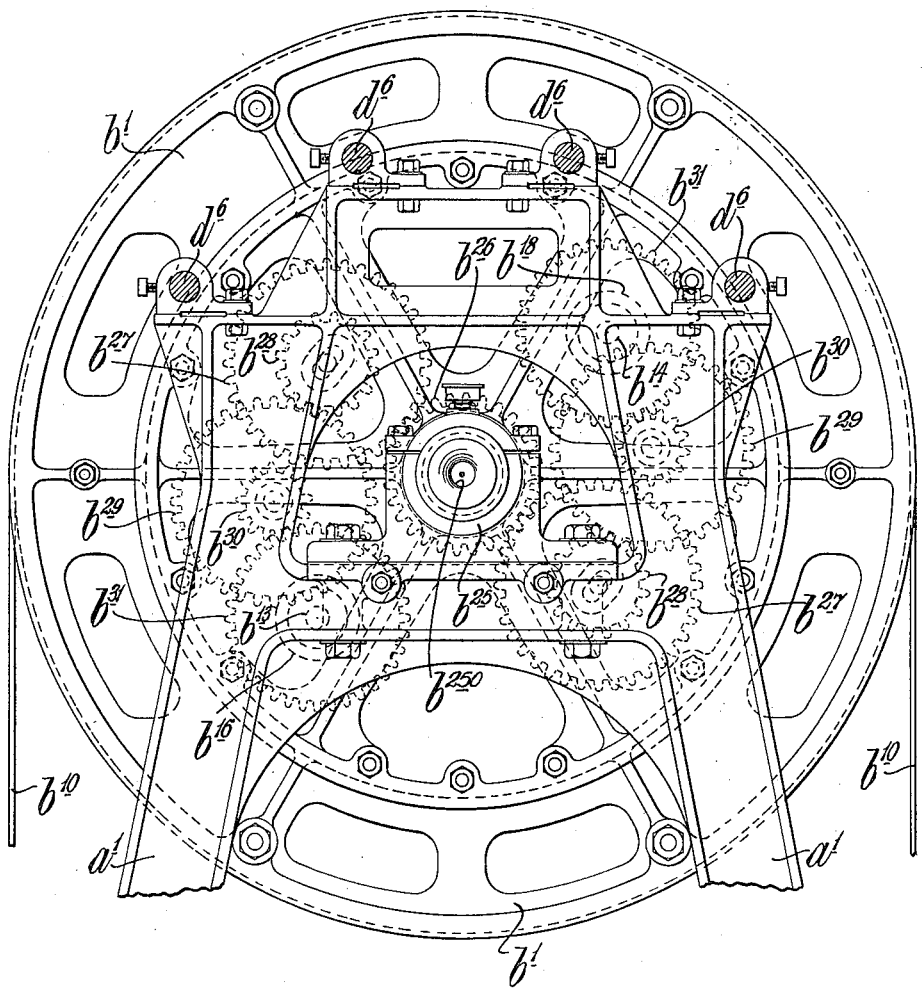

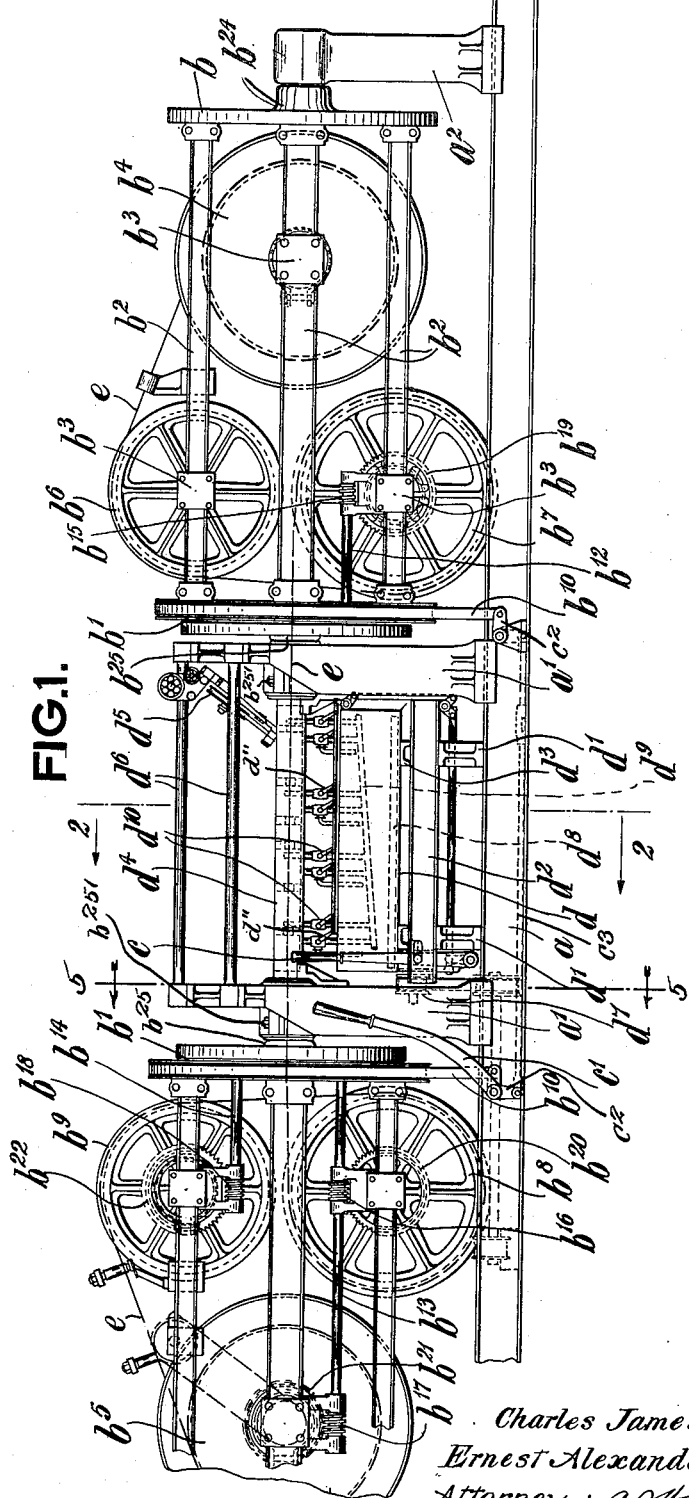

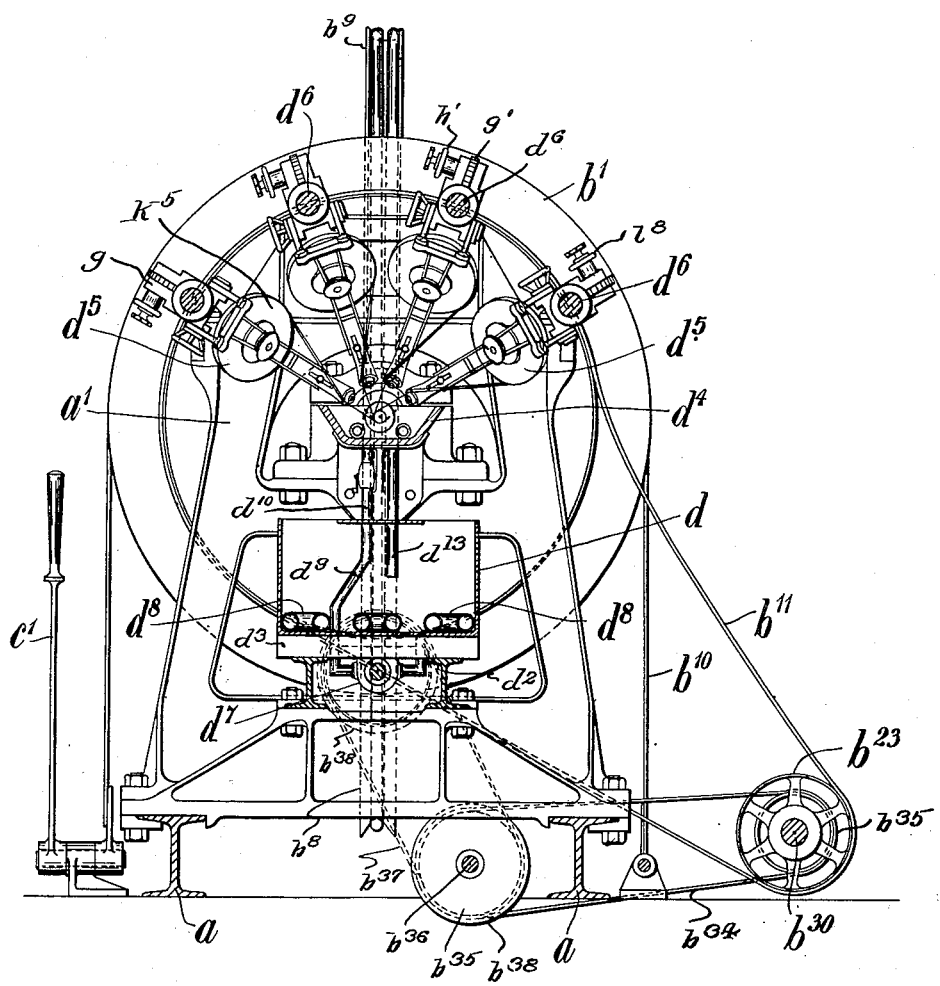

July 6, 1926.
C. J. BEAVER ET AL
1,591,736
INSULATION OF ELECTRIC CABLES
Filed Feb. 27, 1922  4 Sheets-Sheet 3
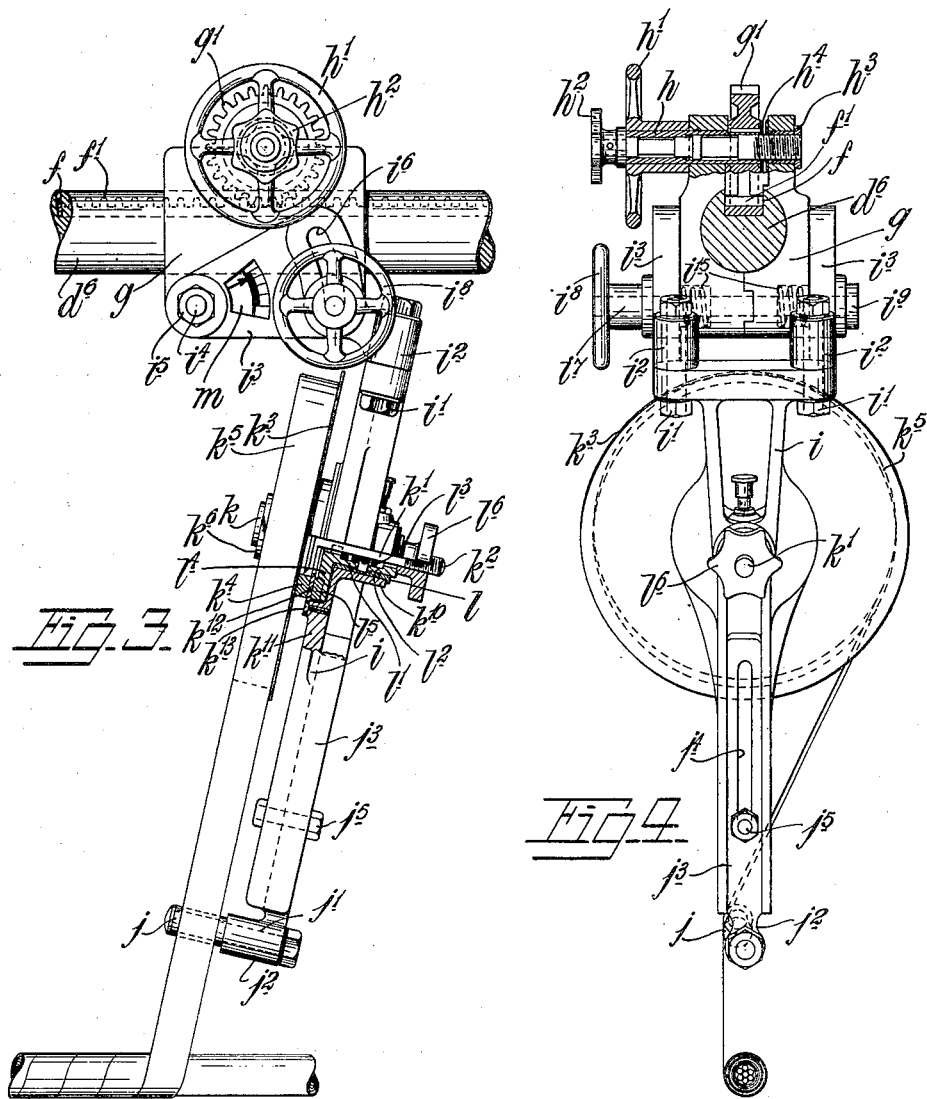
INVENTORS:
Charles James Beaver,
Ernest Alexander Claremont.
ATTORNEY:

July 6, 1926.

C. J. BEAVER ET AL 1,591,736

INSULATION OF ELECTRIC CABLES

Filed Feb. 27, 1922    4 Sheets-Sheet 4

INVENTORS:
Charles James Beaver,
Ernest Alexander Claremont.

ATTORNEY:

Patented July 6, 1926.

1,591,736

UNITED STATES PATENT OFFICE.

CHARLES JAMES BEAVER, OF HALE, AND ERNEST ALEXANDER CLAREMONT, OF DUNHAM MASSEY, ENGLAND, ASSIGNORS TO W. T. GLOVER AND COMPANY LIMITED, OF MANCHESTER, ENGLAND.

INSULATION OF ELECTRIC CABLES.

Application filed February 27, 1922, Serial No. 539,782, and in England March 1, 1921.

This invention has reference to the impregnation with insulating compound, of paper and other lappings constituting the insulation of electric cables.

In such insulation it is of importance especially in high tension cables that all air should be excluded from the insulation both from the interstices and capillary canals of the paper or other material and also from interstices between the lappings.

The object of the present invention is to effect the impregnation of the insulating material or the final impregnation thereof is effected during the process of lapping in a better manner than is done by any means heretofore used or proposed, and to carry out this we have devised an improved machine in which the cable, while being wound off one drum and rewound on another, is passed in a straight line from the point of disengagement from a drum to the point of engagement with another drum (without encountering any axially applied friction when passing through a guide or otherwise) through a tank located between the drums, and instead of the lapping heads being carried round the cable the cable rotates on its axis whilst the lapping heads are stationary, the lapping being thus effected without distortion or disturbance of the laps in a bath of molten compound.

As an example of such a machine the same may consist of three sections arranged longitudinally in relation to one another. The central section is stationary and comprises an elongated trough for containing the molten impregnating compound and having an opening at each end through which a cable can be drawn; a tank containing a supply of said molten compound; a pump and conduits to pump the compound into the trough; conduits for the compound to return to the tank, and overhead bars or other supports to hold the lapping heads.

Each of the other sections comprises a frame rotatably mounted on an axis running through the trough above referred to, in line with the end openings thereof and of the said points of disengagement and engagement of the cable and arranged, as regards one of the sections, in the form of a cage to carry a drum from which the conductor can be fed, and as to the other to carry a drum on to which the conductor can be wound, with respectively pay-off and haul off drums and with the requisite gears and friction discs for operating the same and maintaining the required tension of the cable as it passes through the trough. Driving and gear mechanism is provided by which the two end sections can be made to rotate on the said axis synchronously and by which the pay-off and haul off and the carrying drums are made to revolve at the desired speeds.

It is preferred in the manufacture of a cable, to impregnate the paper or other material in the first instance as a separate operation and subsequently lap it on the cable in a trough containing insulating compound by the method above described.

In the accompanying drawings there is shown an example of the apparatus to give effect to the invention.

Fig. 1 is a side elevation partly in section and Fig. 2 a section on the line 2—2 of Fig. 1 on an enlarged scale looking in the direction of the arrows and with four lapping heads shown in position. Fig. 3 is a side elevation with parts in elevation of a lapping head and associated parts. Fig. 4 is an elevation from the right of Fig. 3 with parts in section and Fig. 5 is a section on line 5—5 of Fig. 1 showing the receiving cage and gears for driving same on an enlarged scale.

In said drawings $a$, $a$ designate two girders extending the whole length of and supporting the apparatus; $a^1$ $a^1$ designate vertical frames bolted to the girders $a$, $a$, and supporting the central stationary section of the apparatus and also carrying the bearings for the journals of the two rotatable sections, and $a^2$ designates a vertical frame likewise bolted to the girders $a$, $a$, supporting the outer end bearing for the journal of one rotating section there being a like frame (not shown) to support the outer end bearing of the other rotatable section.

Each rotatable section includes a cage to carry drums and driving mechanism hereinafter described, and the cage is composed of circular end members $b$ and $b^1$ which may be in the form of a spider wheel, and bars or girders $b^2$ extending from end to end and bolted to the said members. The bars $b^2$ carry journal boxes $b^3$ which receive the journals or axles of the various drums. $b^4$ and $b^5$ are the two drums from which, and on to which, the conductor is fed and received respectively; $b^6$ and $b^7$ designate pay-out drums and $b^8$ and $b^9$ the haul-off drums. The outer peripheral surface of each of the inner end members $b^1$ is of two different radii (conveniently made by bolting two wheels together) and the one with the greater radius is grooved to receive a brake band $b^{10}$ and the other has a flat surface to receive a driving belt $b^{11}$. On each of the end members $b$ and $b^1$ are formed bosses $b^{24}$ and $b^{25}$ with journals each (the bosses $b^{25}$ and their journals having a hole $b^{250}$ (Fig. 5) through its centre) working in bearings formed in bosses $b^{251}$ attached to the frames $a^1$ and the latter bosses each having a hole through its centre so that the cable can be threaded through all said bosses.

Within each of the circular end members $b^1$ and in the same plane but rigidly connected to the bosses attached to the frames $a^1$, is a toothed pinion $b^{26}$ (see Fig. 5) which drives a chain of gears, $b^{27}$, $b^{28}$, $b^{29}$, $b^{30}$, $b^{31}$ at each side within and in the same plane as the circular end member to drive shafts $b^{13}$ and $b^{14}$ respectively, a similar gearing being provided on the pay-off side to drive the shaft $b^{12}$, said shafts $b^{12}$, $b^{13}$ and $b^{14}$ carry the worms $b^{15}$, $b^{16}$, $b^{17}$ and $b^{18}$ which engage respectively the toothed wheels $b^{19}$, $b^{20}$, $b^{21}$ and $b^{22}$ attached or connected (as to $b^{20}$ rigidly and as to $b^{19}$, $b^{21}$ and $b^{22}$ through a friction device) to the drums $b^7$, $b^5$, $b^8$, and $b^9$ respectively by which means when the cages are rotated such drums are respectively driven at the required speed.

Each of the cages is caused to rotate separately but synchronously, being driven from a shaft $b^{30}$ (Fig. 2) parallel to the frame or girders $a$ $a$ and upon which are mounted band pulleys $b^{23}$ (one only shown) driving, through belts $b^{11}$ (one only shown), the circular end members $b^1$ and with them the whole of the rotatable parts. The belt pulley $b^{23}$ is driven through belt and pulley mechanism $b^{34}$, $b^{35}$ from a main drive shaft $b^{36}$. $c$ designates a lever for controlling any convenient clutch mechanism (not shown) connecting the driving gear of the cages and $c^1$ designates a hand lever controlling the brake bands $b^{10}$ through bell cranks $c^2$ connected by rod $c^3$. $d$ is a tank supported in the central section to contain molten compound and carried by girders or supports $d^1$, $d^2$, and $d^3$ $d^4$ is a trough in which the lapping on of the conductor is effected; $d^5$ are lapping heads supported on the parallel bars or rods $d^6$.

The said lapping heads are shown in detail in Figs. 3 and 4. $d^6$ is the bar or rod, $f$ being a longitudinal groove. $f^1$ a rack along the base of same. $g$ is a sliding member made in two halves each of which is cut away at the upper part to make room for a pinion $g^1$ engaging the rack $f^1$ and to form bearings for a hollow shaft $h$ on which the pinion is mounted; $h^1$ is a hand wheel to actuate the said pinion. $h^2$ is a clamping screw concentric with the shaft $h$ threaded to engage an internal thread in the bush $h^3$ to clamp the member $g$ to the bar or rod $d^6$; $h^4$ is a spring washer which forces the halves of the member $g$ apart when the clamping screw is slackened. The clamping screw is so constructed (e. g. the bearing surfaces are narrow and the friction is small in proportion to the force required to move the head along the bar) that when slackened it is not affected by rotation of the hand wheel $h^1$; $i$ is the bracket or arm carrying the spool fastened by bolts $i^1$ to lugs $i^2$ attached to quadrant plate $i^3$ on the sides of the member $g$. The quadrant plates $i^3$ are pivoted to the member $g$ by the bolt $i^4$ which passes through a hole in the member and is secured by a nut $i^5$. In the quadrant plates are slots $i^6$; $i^7$ is a clamping screw passing through the slots $i^6$ and through a hole in the member $g$ furnished with a hand wheel $i^8$ and a threaded nut $i^9$; $i^{15}$ are spiral springs offering frictional resistance to the movement of the quadrant plates when the clamping screw is loosened so as to facilitate adjustment. $j$ is a roller mounted on an axle $j^1$ which passes through a hole in and is supported by a boss $j^2$ formed on an arm $j^3$. Through the arm $j^3$ is an elongated slot $j^4$. The arm $j^3$ is attached to the bracket $i$ by a threaded bolt $j^5$ which passes through the slot $j^4$, and a hole in the bracket $i$ and is secured by a nut. $k$ is the hub or bar of the spool carrier rigid with the spindle $k^1$ which is threaded at the end $k$; $k^3$ is a flange rigidly mounted on the spindle $k^2$. On the side of the flange $k^3$ is a flat ring $k^4$ of leather or brake fabric material. $k^5$ is the spool. By means of corresponding flats or keyed portions or other suitable means the spool $k^5$ is prevented from rotating on the carrier. $k^6$ is a spring collar to keep the spool in position axially. On the bracket $i$ is formed a circular boss of two diameters $k^{10}$ being the smaller part and $k^{11}$ the larger part; $k^{12}$ is a flat disc or ring or inwardly projecting flange fastened by screws $k^{13}$ to the part of the boss $k^{11}$. $l$ is a bush forming the bearing for the spindle $k$ and $l^1$ and $l^2$ are sleeves mounted on the spindle $k^1$ and keyed thereto so as to be movable axially but not rotatably in relation thereto; each of the sleeves $l^1$ and $l^2$ internally recessed so as to receive the spiral spring $l^3$ and on the sleeve $l^1$ is formed a disc or flange $l^4$. To the flange $l^4$ is fixed a ring $l^5$ made of leather or brake fabric material. $l^6$ is a nut threaded to correspond with the thread on the spindle $k$.

With the above described apparatus by means of the hand wheel $h^1$ and clamp screw $h^2$, the member $g$ can be adjusted and fixed at any position on the bar $d^6$ by means of the slotted quadrant plates $i^3$ and the clamping screw $i^7$ the angle of inclination of the bracket $i$ can be adjusted and fixed as desired; by means of the arm $j^3$ and the bolt $j^5$ the roller $j$ can be adjusted and fixed as desired; and by means of the nut $l$ controlling the tension of the spring $l^3$ the degree of friction exerted by the rings $k^4$ and $l^5$ on the flange $k^{12}$ can be regulated.

To facilitate the adjusting of the inclination of the bracket $j$ an automatic indicator is provided for example a sector slot $m$ in one of the quadrant plates and on the part of the member thereby $j$ exposed is marked a scale and on the quadrant plate a pointer by which the angle of inclination of the bracket is automatically shown. For the purpose of indicating the distance of two lapping heads on a bar from one another in order to secure accuracy in the lapping of successive layers a scale may be provided on any convenient part of one member with a pointer attached to the other member moving on the face of such scale or a scale on the bar with a pointer on each sliding member.

$d^7$ is a pump driven from the shaft $b^{36}$ by belt and pulley gear $b^{37}$, $b^{38}$ and which draws the liquid compound from the tank $d$ and propels it into the trough $d^4$. $d^8$ are pipes lying along the bottom of the tank $d$ and conveying steam for the purpose of keeping the impregnating compound at the desired temperature, and $d^9$ is a main pipe through which the liquid is propelled and supplying a series of smaller pipes $d^{10}$ leading to the trough.

Preferably there are series of pipes $d^{10}$ within the trough which lead from the main pipe $d^9$ to the bottom thereof. These are supplied with valved bi-passes $d^{11}$ by which if desired the liquid compound is returned to the tank so that the supply to the trough may be temporarily cut off without stopping the pump $d^7$. Suitable overflow pipes (not shown) leading from the level near the top of the trough for permitting the compound to flow back into the tank and exhause pipes communicating with the bottom of the trough for emptying the same may be employed.

$e$ designates the conductor being fed and drawn from the drum $b^4$ over the drum $b^6$ round the drum $b^7$ through the trough $d^4$ passing through the bosses of the circular or end member $b^1$ and through the bosses and bearing attached to frames $a^1$, thence round the drums $b^8$ over the drum $b^9$ and wound on the drum $b^5$.

The effect of the present invention, so far as concerns the lapping in a trough containing the compound is that while all the advantages hitherto secured by the respective methods of lapping first and impregnating after, and vice versa are secured, additional advantages are also obtained namely the eliminating or diminishing of the possibility of air being retained and trapped in the crevices between the lappings, and further by the apparatus described facility for adjustment of the lapping heads for tension and angle of inclination is secured without stopping the machine.

What we claim as our invention and desire to secure by Letters Patent of the United States is:—

1. A wrapping machine of the class described, comprising a trough, means supplying a liquid to said trough, an unwinding drum at one end of the trough carrying a member adapted to pass therethrough, payout drums associated with the unwinding drum, a winding drum at the other end of the trough, haul-off drums associated with the winding drum, spaced rods connected to said trough, wrapping means connected to each of said rods and longitudinally adjustable thereon, said means carrying material adapted to be wrapped on the member carried by the drums as the latter passes through the machine.

2. A wrapping machine of the class described comprising a trough, means for supplying a molten insulating compound to said trough, a rotatable cage positioned on each side of said trough, an unwinding drum journalled in one of said cages and a winding drum journalled in the other of said cages, a cable carried by said unwinding drum and passing in a straight line from the point of disengagement from said drum through the trough to the point of engagement with the winding drum, driving means carried by said cages and operatively connected to said drums for rotating the same and securing the required relative speeds of the drums and required tension of the cables, a non-revolvable member above said trough, strip insulating material carried by said member, and means for wrapping said material on said cable as the latter passes through the trough.

3. A wrapping machine of the class described comprising a trough, means for supplying a molten insulating compound to said trough, a rotatable cage positioned on each side of said trough, an unwinding drum journalled in one of said cages and a winding drum journalled in the other of said cages, a cable carried by said unwinding drum and passing in a straight line from the point of disengagement from said drum through the trough to the point of engagement with winding drum, driving means carried by said cages and operatively connecting with said drums for rotating same and for securing the required relative speeds of the drums and required tension of the cable, a non-revolvable member above said trough, strip insulating material carried by said member, and means for continuously wrapping said material on said cable as the latter passes through the trough.

4. A wrapping machine of the class described comprising a trough, means for supplying a molten insulating compound to said trough, means for maintaining the compound in liquid form, a rotatable cage positioned on each side of said trough, an unwinding drum journalled in one of the cages and a winding drum journalled in the other of the cages, a cable on said unwinding drum passing in a straight line from the point of disengagement from said drum through the trough to the point of engagement with the winding drum, driving means carried by the said cages and operatively connecting to the said drums for rotating same and for securing required relative speeds of the drums and required tension of the cable, a stationary member mounted on said machine above said trough, strip insulating material carried by said member, and means for continuously wrapping said material on said cable as the latter passes through the trough.

5. A wrapping machine of the class described comprising a trough, means for supplying a liquid insulating compound to said trough, a rotatable cage positioned on each side of said trough, a series of unwinding drums journalled in one of said cages and a series of winding drums journalled in the other of said cages, driving means carried by said cages and operatively connected to each of the drums, a conductor carried by said unwinding drums, and passing through said trough and engaging said winding drums, spaced rods connected to said machine above said trough, a wrapping head secured to each of said rods and longitudinally adjustable thereon, strip insulating material carried by the wrapping heads, and means for continuously wrapping said material on the conductor as the latter passes through the trough.

6. A wrapping machine of the class described comprising a trough, means for supplying a liquid insulating compound to said trough, a rotatable cage positioned on each side of said trough, a series of unwinding drums journalled in one of said cages and a series of winding drums journalled in the other of said cages, driving means carried by said cages and operatively connected to each of the drums, a conductor carried by said unwinding drums, and passing through said trough and engaging said winding drums, arcuately spaced rods mounted on said machine above said trough, a clamping member secured to each of said rods, means for longitudinally adjusting the members on the rods spools connected to said members, means for adjusting said spools relative to said members, strip insulating material carried by said spools and engaging said conductor, and means for wrapping said material on the conductor as the latter passes through the trough.

7. A wrapping machine of the class described comprising a trough, means for supplying a liquid insulating compound to said trough, a rotatable cage positioned on each side of said trough, a series of unwinding drums journalled in one of said cages and a series of winding drums, journalled in the other of said cages, driving means carried by said cages and operatively connected to each of the drums, a conductor carried by said unwinding drums and passing through said trough and engaging said winding drums, arcuately spaced rods mounted on said machine above said trough, clamping members secured to said rods, means for longitudinally adjusting the member relative to the rods, brackets connected to said members, spools carried by said brackets, means for maintaining said brackets in a predetermined position relative to said members, strip insulating material on said spools, and means for wrapping said material on said conductor as the latter passes through the trough.

8. A wrapping machine of the class described comprising a trough, insulating liquid in said trough, a rotatable cage positioned on each side of said trough, an unwinding drum journalled to one of the cages and a winding drum journalled to the other, driving means connected to the adjacent ends of the cages and to said drums for simultaneously rotating the cages and the drums, a conductor carried by the unwinding drum and passing through said trough and secured to said winding drum, a support mounted above said trough, strip insulating material carried by said support, and means for wrapping said material on said conductor as the latter passes through the trough.

9. The combination with a wrapping machine of the class described, a trough, a conductor adapted to be passed through said trough, a rod mounted on said machine above said trough, a clamping member slidably secured to said rod, means for adjusting said member longitudinally relative to the rod, a bracket suspended from said member, means for varying the angle of inclination of the bracket, a spool connected to said bracket, and strip insulating material carried by said spool and adapted to be wrapped on said conductor as the latter passes through the trough.

In witness whereof we have signed this specification.

CHARLES JAMES BEAVER.
ERNEST ALEXANDER CLAREMONT.